United States Patent
Dighe et al.

[11] Patent Number: 6,125,116
[45] Date of Patent: Sep. 26, 2000

[54] MESSAGE SETS FOR A FLEXIBLE PROGRAMMABLE ATM ACCESS MULTIPLEXER USING FUNCTIONAL SEPARATION OF LINE AND PROTOCOL RELATED FUNCTIONS

[75] Inventors: Rajiv Dighe, Princeton; Subir K. Biswas, Plainsboro; Vasanthi Thirumalai, North Brunswick; Kojiro Watanabe; Gopalakrishnan Ramamurthy, both of Cranbury, all of N.J.

[73] Assignee: NEC Corporation, Tokyo, Japan

[21] Appl. No.: 09/185,592

[22] Filed: Nov. 4, 1998

Related U.S. Application Data

[60] Provisional application No. 60/094,197, Jul. 27, 1998.

[51] Int. Cl.⁷ .................................................. H04L 12/28
[52] U.S. Cl. ............................................. 370/395; 370/474
[58] Field of Search ................................... 370/249, 395, 370/410, 400, 475, 474, 473, 471, 465, 522, 419, 463, 466, 467, 401, 359

[56] References Cited

U.S. PATENT DOCUMENTS

| | | | |
|---|---|---|---|
| 4,399,531 | 8/1983 | Grande et al. | 370/395 |
| 4,704,717 | 11/1987 | King, Jr. | 370/400 |
| 4,894,826 | 1/1990 | Aggers et al. | 370/400 |
| 4,970,714 | 11/1990 | Chen et al. | 370/216 |
| 5,111,198 | 5/1992 | Kuszmaul | 370/393 |
| 5,189,668 | 2/1993 | Takatori et al. | 370/427 |
| 5,444,849 | 8/1995 | Farrand et al. | 395/200.09 |
| 5,446,738 | 8/1995 | Kim et al. | 370/395 |
| 5,448,557 | 9/1995 | Hauber | 370/396 |
| 5,499,238 | 3/1996 | Shon | 370/399 |
| 5,499,263 | 3/1996 | Schmit et al. | 370/537 |
| 5,509,007 | 4/1996 | Takashima et al. | 370/391 |
| 5,513,178 | 4/1996 | Tanaka | 370/395 |
| 5,524,113 | 6/1996 | Gaddis | 370/395 |
| 5,537,402 | 7/1996 | Notani et al. | 370/395 |
| 5,541,915 | 7/1996 | Storm | 370/390 |
| 5,548,588 | 8/1996 | Ganmukhi et al. | 370/413 |
| 5,576,873 | 11/1996 | Crossland et al. | 395/117 |
| 5,594,723 | 1/1997 | Tibi | 370/412 |
| 5,623,493 | 4/1997 | Kagemoto | 370/397 |
| 5,654,964 | 8/1997 | Wake | 370/474 |
| 5,737,314 | 4/1998 | Hatono et al. | 370/235 |
| 5,768,274 | 6/1998 | Murakami et al. | 370/429 |
| 5,771,234 | 6/1998 | Wu et al. | 370/396 |
| 5,774,689 | 6/1998 | Curtis et al. | 395/500 |
| 5,784,376 | 7/1998 | LeGall | 370/460 |
| 5,822,523 | 10/1998 | Dothschild et al. | 395/200.17 |

OTHER PUBLICATIONS

Network Working Group, "Multiprotocol Encapsulation over ATM Adaptation Layer," RFC 1483.
Network Working Group, "Classical IP and ARP over ATM," RFC 1577.
Network Working Group, "Ipsilion Flow Management Protocol Specification for Ipv4 Version 1.0," RFC 1953.
Network Working Group, "Toshiba's Router Architecture Extension for ATM: Overview," RFC 2098.
Network Working Group, "Cisco Systems' Tag Switching Architecture Overview," RFC 2105.

(List continued on next page.)

*Primary Examiner*—Hassan Kizou
*Assistant Examiner*—Daniel Previl
*Attorney, Agent, or Firm*—Sughrue, Mion, Zinn, Macpeak & Seas, PLLC

[57] ABSTRACT

The present invention pertains to message sets for use in a flexible programmable multiplexer for accessing an Asynchronous Transfer Mode (ATM) network. The access multiplexer uses a functional separation of line related functions and protocol related functions. Line interface cards perform line related functions. A message set for use in such a multiplexing system that uses a functional separation of line and protocol related functions is provided. The message set includes a general message, a hello message, a configuration message, a line stabilized message, an identify remote message, an identify remote acknowledgement message, a reset remote message, a report statistics message, a report statistics acknowledgement message, a loopback test message and a dynamic rate adaptation message. A flexible programmable multiplexer that uses the message set is also provided.

10 Claims, 9 Drawing Sheets

| LIF ID | MSG TYPE | Data Fields |
|---|---|---|

OTHER PUBLICATIONS

Network Working Group, "PPP over AAL5," RFC 2364.

Viswanathan, et al., "ARIS: Aggregate Route–Based IP Switching," Internet–Draft, Mar. 1997.

"Frame Relay/ATM PVC Networking Implementation Agreement," The Frame Relay Forum, Document Number FRF.5, Dec. 20, 1994.

"Frame Relay/ATM PVC Service Interworking Implementation Agreement," The Frame Relay Forum, Document Number FRF.8, Apr. 14, 1995.

"Native ATM Services: Semantic Description Version 1.0," The ATM Forum Technical Committee, Feb. 1996.

"Circuit Emulation Service Interoperability Specification," The ATM Forum Technical Committee, Jan. 1997.

"Voice and Telephony over ATM—ATM Trunking Using AAL1 for Narrowband Services," The ATM Forum Technical Committee, Jul. 1997.

"Multi–Protocol Over ATM," The ATM Forum Technical Committee, Jul. 1997.

"Inverse Multiplexing for ATM (IMA) Specification," The ATM Forum Technical Committee, Jul. 1997.

| LIF ID | MSG TYPE | Data Fields |
|---|---|---|

FIG. 1

| Line # | Line Coding | Line Type |
|---|---|---|

FIG. 2

| Message Header | Message Type=HELLO |

FIG.3

| MSG Header | MSG Type=CFG | Data Rates and Formats for Each Channel | SNR Margin | Number Of Bits/Carrier | Framing mode | Max PSD |

FIG.4

| Msg Header | Msg Type=CFG | Framing mode | Line Coding | Line Loopback | Transmit Line Buildout | Idle Code Pattern | Fract T1 |
|---|---|---|---|---|---|---|---|

FIG. 5

| Msg Header | Msg Type=CFG1 | Channel # | Robbed Bit/Clear DS0 | HDLC/ Clear | CRC-32 CRCCCITT | Packet Memory Address |
|---|---|---|---|---|---|---|

FIG. 6

| Msg Header | Msg Type=LSF | Data Rates and Format for each channel | SNR Margin | Number of Bits/Carrier | Framing mode | Max PSD |

FIG. 7

| Message Header | Message Type=IdRemote |

FIG. 8

| Msg Header | Msg Type=IdRem | Serial Number | Vendor Id | Ver Number |
|---|---|---|---|---|

FIG. 9

| Message Header | Message Type=IdRemote |
|---|---|

| MSG Hdr | Msg Typ | COP | CTR | CCWL | CSNR | CATN | CRG | LOF | LOS | LOP | LCWL | ES | R/L | LOC | HEC |
|---|---|---|---|---|---|---|---|---|---|---|---|---|---|---|---|
| | | | | | | | | | | | | | | | |

MESSAGE SETS FOR A FLEXIBLE PROGRAMMABLE ATM ACCESS MULTIPLEXER USING FUNCTIONAL SEPARATION OF LINE AND PROTOCOL RELATED FUNCTIONS

This application claims priority from co-pending U.S. Provisional patent application Ser. No. 60/094,197 filed on Jul. 27, 1998.

I. DESCRIPTION OF THE INVENTION

IA. Field of the Invention

The present invention relates to a flexible programmable multiplexer for accessing an Asynchronous Transfer Mode (ATM) network. Specifically, the present invention provides messages for use between a line interface card (LIF) and a universal interface card (UIF). The present invention is embodied in a multiplexing system that uses these messages to communicate between a UIF and an LIF; and a set of messages for use between a UIF and an LIF.

IB. Background

Present day communication edge devices comprise multiple physical interfaces attached to them. A heterogeneous network needs to cater to them all. For each of these physical interfaces, several different protocols can be used. As can be readily appreciated by a skilled artisan, multiple technologies coupled with multiple protocols lead to a large number of configurations making it expensive to maintain this network.

Further, commercial chipsets for line level functions involving physical interfaces are cheaply available and sufficiently well designed. Therefore, line level functions can be performed with dedicated hardware without resorting to software implementations.

Several flexible access multiplexers that can incorporate any service on any port have been proposed. Sentient is a well known product that incorporates these features. In the approach used in Sentient, a special purpose VLSI protocol engine was developed to define a common set of functions for a variety of protocols such as Frame Relay (FR), Inverse Multiplexer, Point to Point (PPP) and Integrated Services Digital Network (ISDN). Further, a programmable element was provided to set the policies to enable different services on any given channel. However Sentient's design is based on one physical interface (channelized DS-3) and is hardware intensive (as many as 70 IC's had to be designed).

Different approaches have also been used by practitioners in the field. One such approach consists of taking a well-known CPU such as a MIPS core and adding a communications coprocessor to it. The communication coprocessor is optimized for specific communications related functions such as hunting for a pattern including High Layer Datalink Casting (HDLC) flags, bit stuffing/destuffing and Cyclic Redundancy Check (CRC) checks. However, the performance penalty in trying to do these low level functions in software is significant.

A flexible programmable mulitplexer without the above-mentioned problems is described in detail in U.S. patent application No. 09/184,640 by Dighe, et al, which is incorporated herein by reference. Such a flexible programmable multiplexer has line related functions functionally separated from higher layer protocol related functions. The functional separation, in the described system, is achieved by physically separating at least one line interface card (LIF) from at least one universal interface card (UIF) wherein said LIF performs line related functions and the UIF performs higher level protocol related functions.

For using such a flexible universal access multiplexing system efficiently, a set of messages is required.

II. SUMMARY OF THE PRESENT INVENTION

It is an objective of the present invention to provide a set of messages to be used between an LIF and a UIF in a ATM-based universal access multiplexer.

To achieve the objectives of the present invention there is provided a message for use in an ATM multiplexing system said system comprising at least one UIF and at least one LIF, wherein said message is one of a plurality of messages used for communicating between said UIF and said LIF, wherein all of said plurality of messages have a same format, said message having a header and contents, said header having an LIF identifier and message type, said contents having a number of data fields, exact number of data fields depends on the header.

Preferably the LIF identifier further has a physical identifier and a protocol identifier, wherein said physical identifier is ADSL, ADSL-lite, HDSL-2, VDSL, T1, T3, Ethernet or Radio cards, wherein said protocol identifier specifies whether data path is one of cell-based and frame-based, and said protocol identifier having a line-specific sub identifier.

Preferably the message corresponds to a hello message being sent by the LIF to the UIF and said hello message conveys the LIF identifier to the UIF enabling the UIF to download appropriate configuration files.

Preferably the message corresponds to a configuration message being sent by the UIF to the LIF and said configuration contains provisioning information, said provisioning information is loaded onto LIF tables to operate said LIF and UIF.

Preferably the message corresponds to a line stabilized message sent by the LIF to the UIF on successful completion of channel activation.

Preferably the message corresponds to an identify remote message sent by the UIF to the LIF wherein the UIF requests a remote host for details, said identify remote message having no data except line number.

Preferably the message corresponds to an identify remote acknowledgement message sent by the LIF to the UIF wherein the LIF passes on the identity of the remote host, including version number, vendor-id and serial number.

Preferably the message corresponds to reset remote message sent by the UIF to the LIF wherein the UIF resets the remote.

Preferably the message corresponds to report statistics message sent by the UIF to the LIF wherein the UIF requests collected statistics corresponding to local host and remote host.

Preferably the message corresponds to report statistics acknowledgement message sent by the LIF to the UIF wherein requested statistics corresponding to local host and remote host is provided to the UIF.

Preferably the message corresponds to loopback test message sent by the UIF to the LIF wherein the UIF initiates loopback tests.

Another aspect of the present invention is a flexible programmable multiplexer having line related functions functionally separated from higher layer protocol related functions, said functional separation being done by physically separating at least one line interface card (LIF) from at least one universal interface card (UIF) wherein said line interface card (LIF) performs said line related functions and said universal interface card performs said higher level protocol related functions, wherein said UIF communicates with said LIF using a plurality of messages wherein all of said plurality of messages have a same format, said message having a header and contents, said header having an LIF identifier and message type, said contents having a number of data fields, exact number of data fields depends on the header.

Preferably the LIF identifier further has a physical identifier and a protocol identifier, wherein said physical identifier is ADSL, ADSL-lite, HDSL-2, VDSL, T1, T3, Ethernet or Radio cards, wherein said protocol identifier specifies whether data path is one of cell-based and frame-based, and said protocol identifier having a line-specific sub identifier.

Preferably the message corresponds to a hello message being sent by the LIF to the UIF and said hello message conveys the LIF identifier to the UIF enabling the UIF to download appropriate configuration files.

Preferably the multiplexer corresponds to a configuration message being sent by the UIF to the LIF and said configuration contains provisioning information, said provisioning information is loaded onto LIF tables to operate said LIF and UIF.

Preferably the message corresponds to a line stabilized message sent by the LIF to the UIF on successful completion of channel activation.

Preferably the message corresponds to an identify remote message sent by the UIF to the LIF wherein the UIF requests a remote host for details, said identify remote message having no data except line number.

Preferably the message corresponds to an identify remote acknowledgement message sent by the LIF to the UIF wherein the LIF passes on the identity of the remote host, including version number, vendor-id and serial number.

Preferably the message corresponds to reset remote message sent by the UIF to the LIF wherein the UIF resets the remote.

Preferably the message corresponds to report statistics message sent by the UIF to the LIF wherein the UIF requests collected statistics corresponding to local host and remote host.

Preferably the message corresponds to report statistics acknowledgement message sent by the LIF to the UIF wherein requested statistics corresponding to local host and remote host is provided to the UIF.

Preferably the message corresponds to loopback test message sent by the UIF to the LIF wherein the UIF initiates loopback tests.

III. LIST OF FIGURES

The above objectives and advantages of the present invention will become more apparent by describing in detail preferred embodiments thereof with reference to the attached drawings in which.

IV. DETAILED DESCRIPTION OF PREFERRED EMBODIMENTS

IVA. General Message Format

Figure 14:
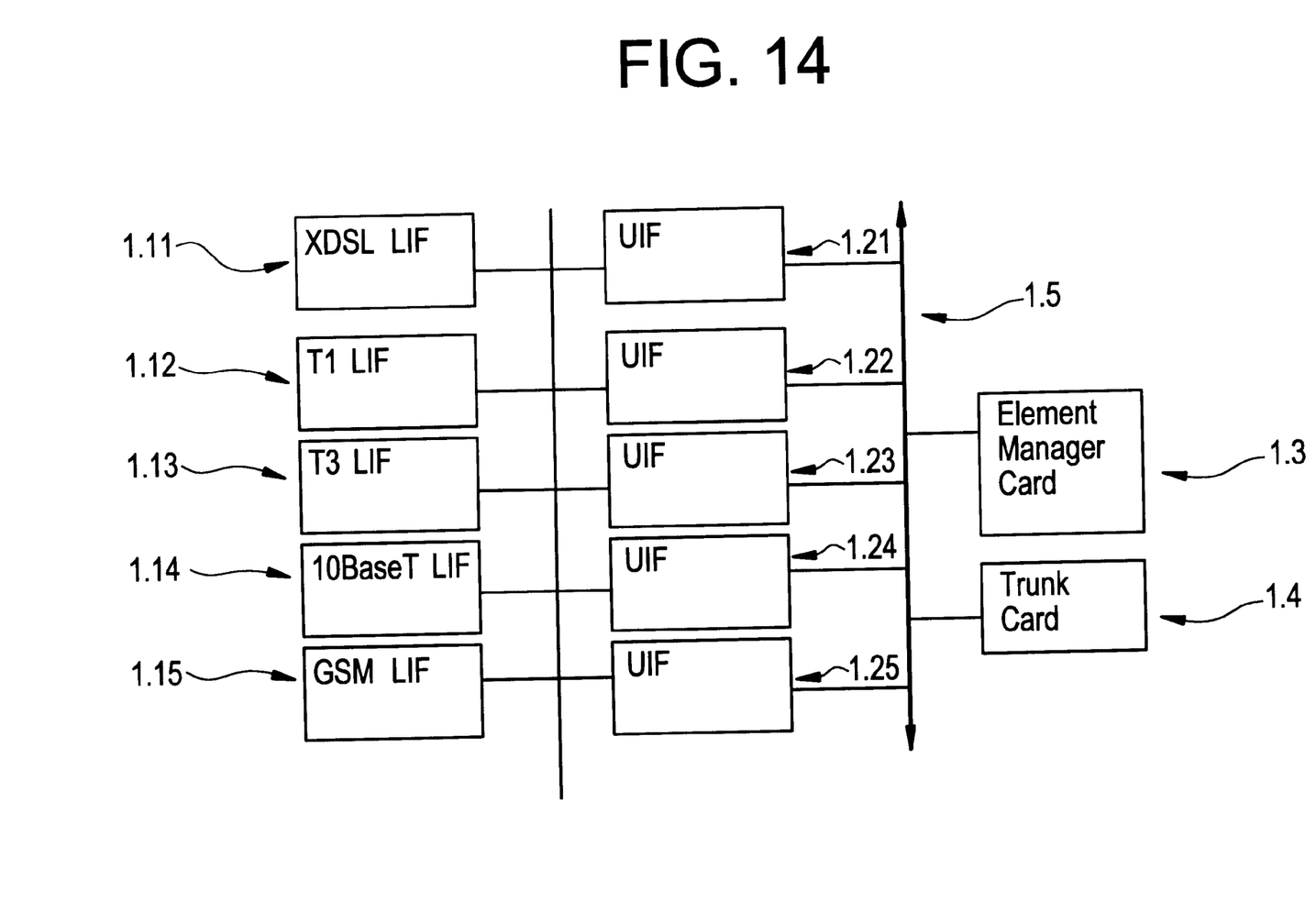
FIG. 14 shows a conceptual architecture of a multiplexer that embodies the present invention.

A conceptual architecture showing a flexible accessible multiplexer is shown in FIG. 14. 1.11–1.15 are the various LIFs connected to UIFs represented by 1.21–1.25. It should be noted that several instances of UIFs are used but they are all of the same type. The UIF is connected to a Cell Bus 1.5. The Element Management Card 1.3 and Cell multiplexer Card 1.4 are described in detail in the U.S. application Ser. No. 09/184,640.

Figure 1:
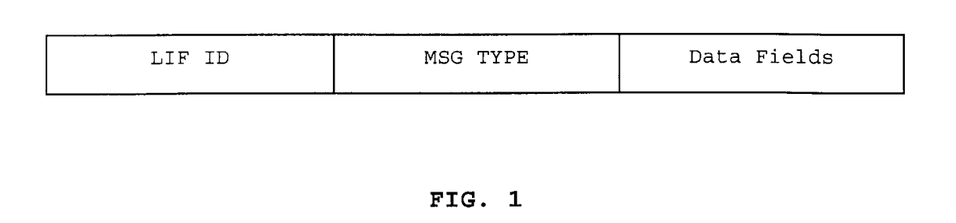
FIG. 1 shows an example of a general message format according to the present invention.

All the messages that are exchanged between the LIF and the UIF have the same format. Each message has a header followed by the contents of the message. The header has an LIF identifier and the message type. The message content is a variable number of data fields. The exact number of the data fields and their contents depends on the message header. An example of a general format for a message is shown in FIG. 1. The present invention is not limited to any specific number of bytes allocated for each of the fields.

The LIF ID is further classified into sub-fields namely PHY ID and the Protocol ID. The PHY ID is typically one of:

xDSL (ADSL, ADSL-lite, HDSL-2, VDSL etc.)
T1
T3
Ethernet (10 BaseT, 100 BaseT)
Radio cards (GSM, CDMA, IAS-54 etc.)

The Protocol ID specifies whether the data path is cell-based or frame-based (UTOPIA or PCI). A line specific protocol sub ID is also provided. For the ADSL line card, the protocol sub ID can be used to specify the line id, line coding (DMT, CAP, QAM) and line type (FAST, INTERLEAVED etc.). The number of lines that are being supported on the line card is also conveyed in the LIF ID.

Figure 2:
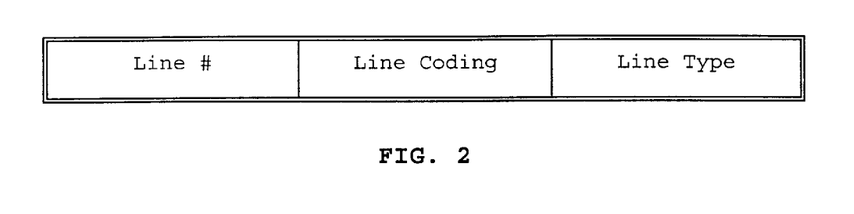
FIG. 2 shows an LIF Sub-ID field according to the present invention.

The LIF Sub-ID field typically looks like as shown in FIG. 2. A special code point needs to be defined on the Line # field to indicate it applies to all lines on an LIF.

IVB. Hello Message (LIF→UIF)

Figure 3:
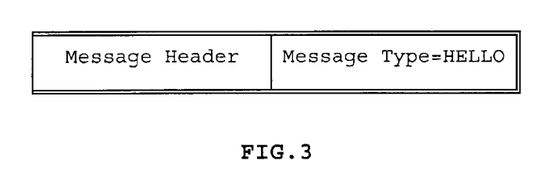
FIG. 3 shows an example of a Hello message according to the present invention.

A hello message is the first message that is sent by the LIF to the UIF. This message is common for all LIFs. An example of the format of a hello message is shown in FIG. 3.

The message type for the hello message is not limited by this invention. The Hello message conveys the LIF IF to the UIF and enables the UIF to download the correct configuration files to support the LIF from the element management card.

IVC. Configuration Message (UIF→LIF)

Figure 4:
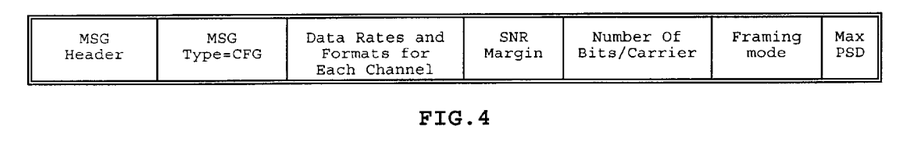
FIG. 4 shows an example of a configuration message for an ADSL line according to the present invention.

The configuration message will vary from LIF to LIF but typically contains provisioning information that needs to be leaded onto the LIF tables to get the card operational. The typical configuration message that one may see for an ADSL LIF is shown in FIG. 4.

Figure 5:
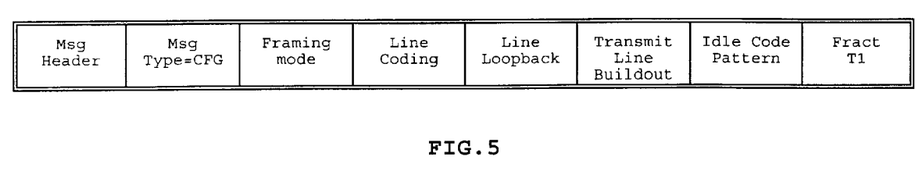
FIG. 5 shows an example of a configuration message for a T1 line according to the present invention.

The CFG message for the T1 line card on the other hand will be as shown in FIG. 5.

The fields in the above message are:

Framing Mode=Superframe, Extended Superframe & Unframed mode

Line Coding=B8ZS/AMI

Line Loopback=Enabled/Disabled

Transmit Line Built Out=0,7.5d B, 15 dB or 22.5 dB programmable.

Idle Code Pattern=Customizable Idle code generation (this can be used for metasignaling)

Fractional T1=Enabled/Disabled. If enabled, idle DSO slots are used to ensure T1's density.

Figure 6:
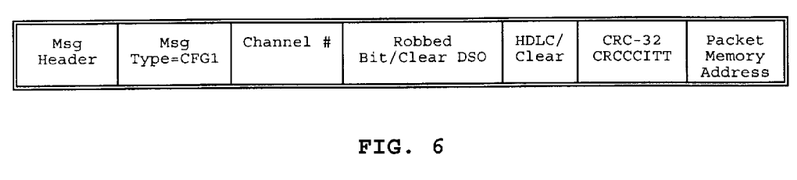
FIG. 6 shows an example of a configuration message for a channelized T1 line according to the present invention.

In the case of channelized T1, further configuration messages need to be sent from the UIF to the LIF on a DSO basis. An example of such a message formate is shown in FIG. 6.

Again for a T3 card one more level of CFG message (D53, DS 1, DSO etc) is provided. The UIF downloads this information to the LIF from an NMS entity before the LIF can start a dialogue with the remote. Hence the time to download these messages to the LIF is critical.

IVD. Line Stabilized (LIF→UIF)

Figure 7:
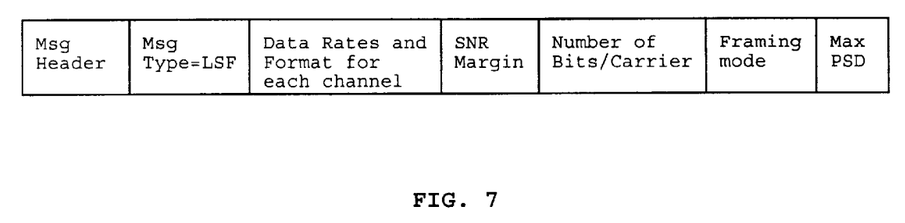
FIG. 7 shows an example of a line stabilization message according to the present invention.

On successful completion of the channel activation/initialization procedure, the LIF sends this message to the UIF. This is an indication to the UIF that the LIF has established the link with the remote and it is ready to perform measurements both at the local and the remote ends. Only after this message is received can the UIF issue any following messages. The format of this message will vary from LIF to LIF but for the ADSL LIF an example for this format is shown in FIG. 7.

The data field types, SNR margins etc. are all the fields that have been agreed upon between the local and the remote during the channel initialization and activation phase.

IVE. Identify Remote (UIF→LIF)

Figure 8:
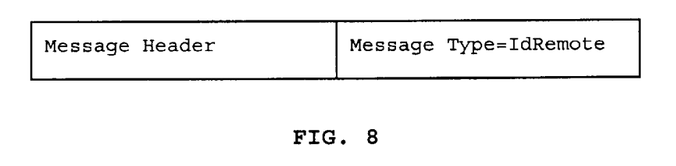
FIG. 8 shows an example of an identify remote message according to the present invention.

The UIF requests details about a remote using this message. This message does not have any data fields except the line number on the LIF. An example of this is shown in FIG. 8.

IVF. Identify Remote Ack (LIF→UIF)

Figure 9:
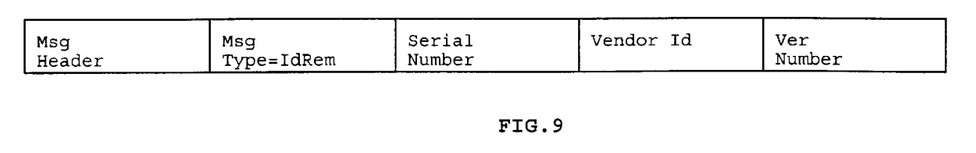
FIG. 9 shows an example of an identify remote acknowledgement message according to the present invention.

It is assumed that the LIF maintains a local copy of the remote's identity. If not it shall probe the remote and get the identity. The LIF passes this identity information in this message. An example is shown in FIG. 9.

IVG. Reset Remote (UIF→LIF)

Figure 10:
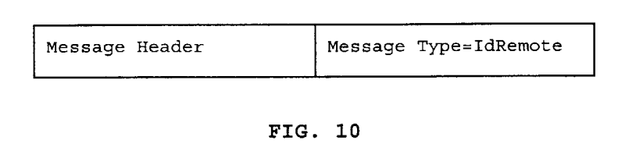
FIG. 10 shows an example of a reset remote message according to the present invention.

This message allows the UIF the means to reset a remote. It is assumed that the LIF has the ability command a remote reset. This message does not have any data fields except for the line card number on the LIF. An example of this message is shown in FIG. 10.

IVH. Report Statistics (UIF→LIF)

Figure 11:
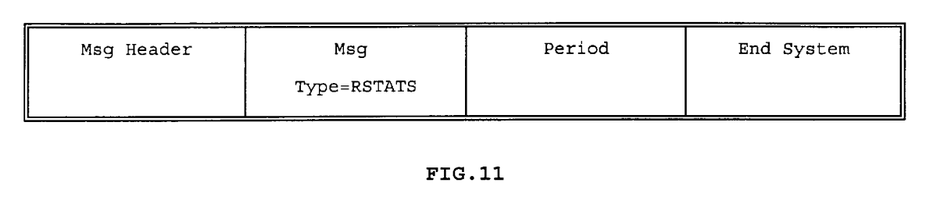
FIG. 11 shows an example of a report statistics message according to the present invention.

The UIF requests collected statistics of the local and remote from the LIF through this message. The period refers to the time period of interest over which statistics are to be collected. The granularity of this period is predetermined. The End System refers to whether the UIF desires local or remote statistics. An example of a report statistics message is shown in FIG. 11.

IVI. Report Stats Ack (LIF→UIF)

Figure 12:
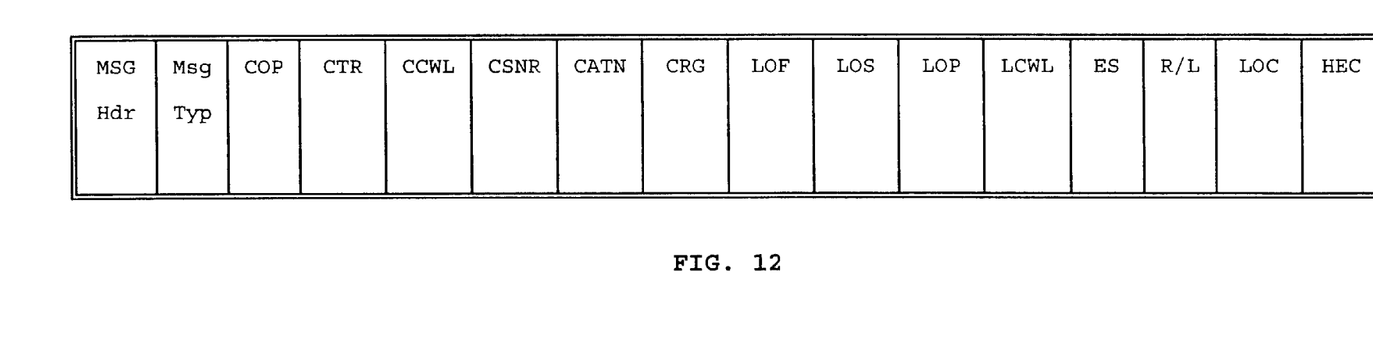
FIG. 12 shows an example of a report statistics acknowledgement message according to the present invention.

The LIF maintains statistics of the local and remote end measured over specific intervals. The format will vary from LIF to LIF. The format for the ADSL LIF report statistics acknowledgement message is shown in FIG. 12.

The details of the above fields are given below:

COP=Current Output Power (dBs)

CTR=Current Transmit Power (dBs)

CCWL=Current Code Word Length

CSNR=Current Attenuation

CRG=Current Receive Gain

LOF=Loss of Frame Counter (reset on reads?)

LOS=Loss of Signal Counter (reset on reads?)

LOP=Loss of Power Counter (reset on reads?)

LCWL=Loss of code word length counter

ES=Errored Seconds

LOC=Loss of Cell Delineation counter

HEC=Leader Check Errors counter

There will also be counters for IDLE and UNASSIGNED Cells that have been discarded during a certain period. A similar statistical message can be passed for other LIFs such as T1.

IVK. Loopback Test (UIF→LIF)

The UIF can initiate loopback tests between the LIF and the remote. The loopback tests can be at various levels (F3, F4, is F5 etc.). The UIF can initiate a loopback procedure all the way upto the remote (CPE) through the LIF. The procedure is started by the Loopback message shown in FIG. 13.

Figure 13:
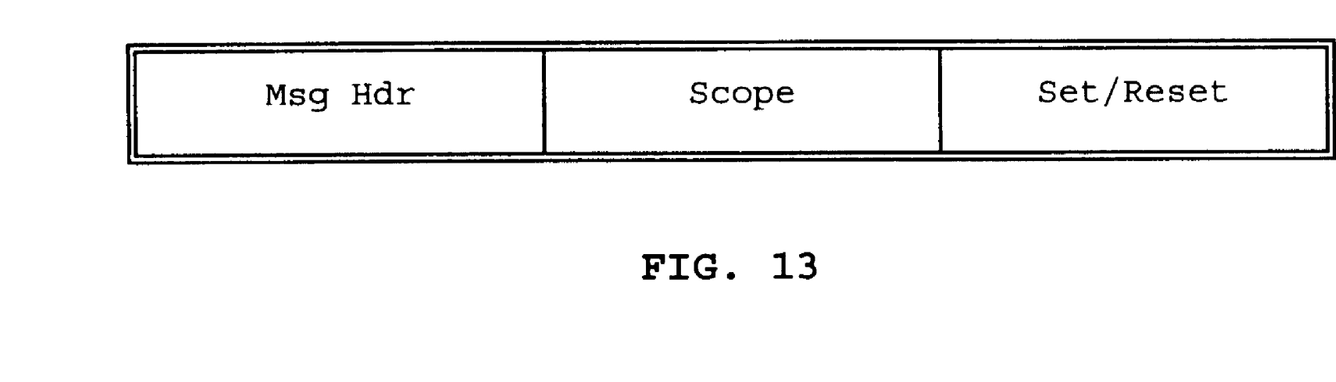
FIG. 13 shows an example of a loopback test message according to the present invention.

The 'Scope' above defines the point at which the loopback should occur. 'Set' initiates a loopback and 'Reset' terminates it.

Once a Loopback is initiated all further cells/frames are to be looped back at the point specified by the previous loopback message.

IVL. Dynamic Rate Adaptation and Flow control

Explicit backoff messages between the LIF and the UIF in order to minimize buffer overflows on the packet memory is provided. The details of the messages depends on the specific flow control mechanism between the LIF and the CPE. A simple XON/XOFF flow control mechanism will be effective for the ethernet line card.

IVM. Messages between Elements Management Card and UIF

The mechanism for message exchange between the UIF and the Elements Manager is probably going to be procedure calls using either RPC or some form of IPC.

Other modifications and variations to the invention will be apparent to those skilled in the art from the foregoing disclosure and teachings. Thus, while only certain embodiments of the invention have been specifically described herein, it will be apparent that numerous modifications may be made thereto without departing from the spirit and scope of the invention.

What is claimed:

1. A flexible programmable multiplexer having line related functions functionally separated from higher layer protocol related functions, said flexible programmable multiplexer comprising at least one line interface card and at least one universal interface card, said functional separation being done by physically separating said at least one line interface card (LIF) from said at least one universal interface card (UIF) wherein said line interface card (LIF) performs said line related functions and said universal interface card performs said higher level protocol related functions, wherein said UIF communicates with said LIF using a plurality of messages wherein all of said plurality of messages have a same format, said message having a header and contents, said header having an LIF identifier and message type, said contents having a number of data fields, exact number of data fields depends on the header,     wherein said LIF identifier further has a physical identifier and a protocol identifier, wherein said physical identifier is ADSL, ADSL-lite, HDSL-2, VDSL, T1, T3, Ethernet or Radio cards, wherein said protocol identifier specifies whether data path is one of cell-based and frame-based, and said protocol identifier having a line-specific sub identifier.

2. A flexible programmable multiplexer having line related functions functionally separated from higher layer protocol related functions, said flexible programmable multiplexer comprising at least one line interface card and at least one universal interface card, said functional separation being done by physically separating said at least one line interface card (LIF) from said at least one universal interface card (UIF) wherein said line interface card (LIF) performs said line related functions and said universal interface card performs said higher level protocol related functions, wherein said UIF communicates with said LIF using a plurality of messages wherein all of said plurality of messages have a same format, said message having a header and contents, said header having an LIF identifier and message type, said contents having a number of data fields, exact number of data fields depends on the header,     wherein said message corresponds to a hello message being sent by the LIF to the UIF and said hello message conveys the LIF identifier to the UIF enabling the UIF to download appropriate configuration files.

3. A flexible programmable multiplexer having line related functions functionally separated from higher layer protocol related functions, said flexible programmable multiplexer comprising at least one line interface card and at least one universal interface card, said functional separation being done by physically separating said at least one line interface card (LIF) from said at least one universal interface card (UIF) wherein said line interface card (LIF) performs said line related functions and said universal interface card performs said higher level protocol related functions, wherein said UIF communicates with said LIF using a plurality of messages wherein all of said plurality of messages have a same format, said message having a header and contents, said header having an LIF identifier and message type, said contents having a number of data fields, exact number of data fields depends on the header,     wherein said message corresponds to a configuration message being sent by the UIF to the LIF and said configuration contains provisioning information, said provisioning information is loaded onto LIF tables to operate said LIF and UIF.

4. A flexible programmable multiplexer having line related functions functionally separated from higher layer protocol related functions, said flexible programmable multiplexer comprising at least one line interface card and at least one universal interface card, said functional separation being done by physically separating said at least one line interface card (LIF) from said at least one universal interface card (UIF) wherein said line interface card (LIF) performs said line related functions and said universal interface card performs said higher level protocol related functions, wherein said UIF communicates with said LIF using a plurality of messages wherein all of said plurality of messages have a same format, said message having a header and contents, said header having an LIF identifier and message type, said contents having a number of data fields, exact number of data fields depends on the header,     wherein said message corresponds to a line stabilized message sent by the LIF to the UIF on successful completion of channel activation.

5. A flexible programmable multiplexer having line related functions functionally separated from higher layer protocol related functions, said flexible programmable multiplexer comprising at least one line interface card and at least one universal interface card, said functional separation being done by physically separating said at least one line interface card (LIF) from said at least one universal interface card (UIF) wherein said line interface card (LIF) performs said line related functions and said universal interface card performs said higher level protocol related functions, wherein said UIF communicates with said LIF using a plurality of messages wherein all of said plurality of messages have a same format, said message having a header and contents, said header having an LIF identifier and message type, said contents having a number of data fields, exact number of data fields depends on the header,     wherein said message corresponds to an identify remote message sent by the UIF to the LIF wherein the UIF requests a remote host for details, said identify remote message having no data except line number.

6. A flexible programmable multiplexer having line related functions functionally separated from higher layer protocol related functions, said flexible programmable multiplexer comprising at least one line interface card and at least one universal interface card, said functional separation being done by physically separating said at least one line interface card (LIF) from said at least one universal interface card (UIF) wherein said line interface card (LIF) performs said line related functions and said universal interface card performs said higher level protocol related functions, wherein said UIF communicates with said LIF using a plurality of messages wherein all of said plurality of messages have a same format, said message having a header and contents, said header having an LIF identifier and message type, said contents having a number of data fields, exact number of data fields depends on the header,     wherein said message corresponds to an identify remote acknowledgement message sent by the LIF to the UIF wherein the LIF passes on the identity of the remote host, including version number, vendor-id and serial number.

7. A flexible programmable multiplexer having line related functions functionally separated from higher layer protocol related functions, said flexible programmable multiplexer comprising at least one line interface card and at least one universal interface card, said functional separation being done by physically separating said at least one line interface card (LIF) from said at least one universal interface card (UIF) wherein said line interface card (LIF) performs said line related functions and said universal interface card performs said higher level protocol related functions, wherein said UIF communicates with said LIF using a plurality of messages wherein all of said plurality of messages have a same format, said message having a header and contents, said header having an LIF identifier and message type, said contents having a number of data fields, exact number of data fields depends on the header, wherein said message corresponds to reset remote message sent by the UIF to the LIF wherein the UIF resets the remote.

8. A flexible programmable multiplexer having line related functions functionally separated from higher layer protocol related functions, said flexible programmable multiplexer comprising at least one line interface card and at least one universal interface card, said functional separation being done by physically separating said at least one line interface card (LIF) from said at least one universal interface card (UIF) wherein said line interface card (LIF) performs said line related functions and said universal interface card performs said higher level protocol related functions, wherein said UIF communicates with said LIF using a plurality of messages wherein all of said plurality of messages have a same format, said message having a header and contents, said header having an LIF identifier and message type, said contents having a number of data fields, exact number of data fields depends on the header, wherein said message corresponds to report statistics message sent by the UIF to the LIF wherein the UIF requests collected statistics corresponding to local host and remote host.

9. A flexible programmable multiplexer having line related functions functionally separated from higher layer protocol related functions, said flexible programmable multiplexer comprising at least one line interface card and at least one universal interface card, said functional separation being done by physically separating said at least one line interface card (LIF) from said at least one universal interface card (UIF) wherein said line interface card (LIF) performs said line related functions and said universal interface card performs said higher level protocol related functions, wherein said UIF communicates with said LIF using a plurality of messages wherein all of said plurality of messages have a same format, said message having a header and contents, said header having an LIF identifier and message type, said contents having a number of data fields, exact number of data fields depends on the header, wherein said message corresponds to report statistics acknowledgement message sent by the LIF to the UIF wherein requested statistics corresponding to local host and remote host is provided to the UIF.

10. A flexible programmable multiplexer having line related functions functionally separated from higher layer protocol related functions, said flexible programmable multiplexer comprising at least one line interface card and at least one universal interface card, said functional separation being done by physically separating said at least one line interface card (LIF) from at least said one universal interface card (UIF) wherein said line interface card (LIF) performs said line related functions and said universal interface card performs said higher level protocol related functions, wherein said UIF communicates with said LIF using a plurality of messages wherein all of said plurality of messages have a same format, said message having a header and contents, said header having an LIF identifier and message type, said contents having a number of data fields, exact number of data fields depends on the header, wherein said message corresponds to loopback test message sent by the UIF to the LIF wherein the UIF initiates loopback tests.

* * * * *